United States Patent
Gu et al.

(10) Patent No.: US 10,606,468 B2
(45) Date of Patent: Mar. 31, 2020

(54) DYNAMIC IMAGE COMPENSATION FOR PRE-TOUCH LOCALIZATION ON A REFLECTIVE SURFACE

(71) Applicant: International Business Machines Corporation, Armonk, NY (US)

(72) Inventors: Yu Gu, Cedar Park, TX (US); Inseok Hwang, Austin, TX (US); Su Liu, Austin, TX (US); Eric J. Rozner, Austin, TX (US); Yaoguang Wei, Austin, TX (US); Chungkuk Yoo, Daejeon (KR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1 day.

(21) Appl. No.: 14/947,011

(22) Filed: Nov. 20, 2015

(65) Prior Publication Data
US 2017/0147142 A1    May 25, 2017

(51) Int. Cl.
*G06F 3/0488*    (2013.01)
*G06F 1/16*    (2006.01)
(Continued)

(52) U.S. Cl.
CPC ............ *G06F 3/0488* (2013.01); *G06F 1/169* (2013.01); *G06F 1/1626* (2013.01);
(Continued)

(58) Field of Classification Search
CPC ................. G06F 3/0418; G06F 3/0488; G06F 2203/04101; G06F 3/0421; G06F 3/0425;
(Continued)

(56) References Cited

U.S. PATENT DOCUMENTS

| 4,704,694 A * | 11/1987 | Czerniejewski ...... G06T 1/0014 209/576 |
| 6,438,523 B1 | 8/2002 | Oberteuffer et al. |

(Continued)

FOREIGN PATENT DOCUMENTS

EP    2073055 A1    6/2009

OTHER PUBLICATIONS

Kratz et al., "PointPose: Finger Pose Estimation for Touch Input on Mobile Devices Using a Depth Sensor", ACM ITS 2013, 9 pages.
(Continued)

*Primary Examiner* — Patrick N Edouard
*Assistant Examiner* — Douglas M Wilson
(74) *Attorney, Agent, or Firm* — Cantor Colburn LLP; Brian Welle

(57) ABSTRACT

An aspect of the disclosure includes a method, a system and a computer program product for removing dynamic images when determining the position of an object relative to a reflective surface. The method includes acquiring a first image of an object and the reflective surface with a camera, the camera positioned adjacent the reflective surface. It is determined when a dynamic element is displayed on the reflective surface. A second image is generated by subtracting the dynamic element from the first image. The object is identified in one of the first image and second image. A reflection of the object on the reflective surface is identified in the second image. Three-dimensional coordinates of at least a portion of the object are determined based at least in part on the identifying of the object and the identifying of the reflection of the object.

20 Claims, 10 Drawing Sheets

(51) Int. Cl.
*G06F 3/042* (2006.01)
*G06F 3/041* (2006.01)

(52) U.S. Cl.
CPC .......... *G06F 1/1643* (2013.01); *G06F 1/1686* (2013.01); *G06F 3/0416* (2013.01); *G06F 3/0418* (2013.01); *G06F 3/0425* (2013.01)

(58) Field of Classification Search
CPC ..... G06F 1/1626; G06T 7/0085; G06T 7/004; G06K 9/46; H04N 5/2254; H04M 1/0264
See application file for complete search history.

(56) References Cited

U.S. PATENT DOCUMENTS

| | | |
|---|---|---|
| 7,629,967 B2 | 12/2009 | Newton |
| 7,969,426 B2 | 6/2011 | Skillman et al. |
| 8,368,795 B2 | 2/2013 | Lo et al. |
| 8,508,508 B2 | 8/2013 | Newton |
| 8,624,846 B2 | 1/2014 | Fukunaga et al. |
| 9,733,764 B2 | 8/2017 | Gu et al. |
| 9,823,782 B2 | 11/2017 | Gu et al. |
| 2003/0181225 A1 | 9/2003 | Hasegawa et al. |
| 2008/0244465 A1 | 10/2008 | Kongqiao et al. |
| 2011/0038535 A1* | 2/2011 | Wang ............. H04N 9/735 382/164 |
| 2011/0081946 A1 | 4/2011 | Singh |
| 2011/0102320 A1 | 5/2011 | Hauke et al. |
| 2011/0102570 A1 | 5/2011 | Wilf et al. |
| 2011/0169780 A1 | 7/2011 | Goertz et al. |
| 2011/0199335 A1 | 8/2011 | Li et al. |
| 2011/0205186 A1 | 8/2011 | Newtown et al. |
| 2011/0285669 A1* | 11/2011 | Lassesson ............. G06F 3/0428 345/175 |
| 2011/0305398 A1 | 12/2011 | Sakakibara |
| 2012/0135803 A1 | 5/2012 | Nonaka et al. |
| 2012/0212413 A1 | 8/2012 | Plagemann et al. |
| 2013/0155029 A1* | 6/2013 | Morrison ............. G06F 3/0428 345/175 |
| 2013/0222640 A1* | 8/2013 | Baek ................. G11B 27/3027 348/231.99 |
| 2013/0234990 A1* | 9/2013 | Wang ................... G06F 3/0428 345/175 |
| 2013/0271369 A1 | 10/2013 | Lu et al. |
| 2013/0285908 A1 | 10/2013 | Kaplan et al. |
| 2014/0152791 A1* | 6/2014 | Sarwar ................... G06F 21/32 348/77 |
| 2014/0168064 A1 | 6/2014 | Kim |
| 2014/0267169 A1 | 9/2014 | McKiel, Jr. |
| 2014/0368434 A1 | 12/2014 | Paek et al. |
| 2015/0009183 A1 | 1/2015 | Ling et al. |
| 2015/0178588 A1* | 6/2015 | Fischer ................ G06K 9/4661 382/103 |
| 2015/0199549 A1* | 7/2015 | Lei ..................... G06K 7/10811 235/462.24 |
| 2016/0139735 A1 | 5/2016 | Lin |

OTHER PUBLICATIONS

Seal et al., "Depth Perception with a Single Camera", International Conference on Sensing Technology, 2005, 7 pages.
Sony XPeria Sola—Floating Touch, introduced in Mar. 2012, 10 pages.
List of IBM Patents or Patent Applications Treated As Related (Appendix P), Filed Nov. 23, 2015, 2 pages.
Yu Gu, et al., Pending U.S. Appl. No. 14/946,994 entitled "Pre-Touch Localization on a Reflective Surface" filed Nov. 20, 2015.
Yu Gu, et al., Pending U.S. Appl. No. 14/947,048 entitled "Tracking of Objects Using Pre-Touch Localization on a Reflective Surface" filed Nov. 20, 2015.
List of IBM Patents or Patent Applications Treated as Related (Appendix P), Filed Jul. 31, 2019, 2 pages.
Tsui et al. ("Intelligent Multimodal User Interface"; Intelligent Systems and Soft Computing :prospects, tools, and applications; pp. 259-283 Azvine et al. (Ed.), 2000, Springer; hereinafter 'Tsui').

\* cited by examiner

DYNAMIC IMAGE COMPENSATION FOR PRE-TOUCH LOCALIZATION ON A REFLECTIVE SURFACE

BACKGROUND

The present invention relates generally to determining the location of an object using a single camera and, more specifically, to determining the location of an object such as a finger or pen relative to a reflective surface such as a display screen.

A variety of interfaces are used to allow users of computing devices to interact, receive and enter information. Traditionally, these interfaces have included keyboards for entering alpha-numeric characters and a pointing device, such as a mouse for example. The movement of the mouse is tracked by a pointer image on the computing device's screen. By moving the pointer with the mouse, the user is able to select objects on the screen, such as icons for example.

More recently, some computing devices have used so-called "touch-screen" pointing devices in place of or in addition to the mouse. A touch screen tracks the location of the user's finger or a stylus when they are placed in close proximity (less than a centimeter) from the display screen. These touch-screen devices are usually layered on top of the computing devices visual display. One type of touch screen measures the change in capacitance that results when an electrostatic field of the screen changes in response to the presence of the user's finger. Other types of touch screen systems determine a location where the user touches the screen based on resistance, infrared grids or piezoelectricity. It should be appreciated that these methods of determining where the user has touched the screen are typically integral to the device. Thus it is difficult to add this functionality to existing computing devices without altering the visual appearance and potentially the usability of the computing device.

Other user-interface systems have been developed that utilize optical imaging to determine the location of the user's finger or a stylus relative to the screen. These systems use either a plurality of cameras in a fixed geometric relationship that acquire images of the user's finger from at least two different positions. These camera pairs are sometimes referred to as stereoscopic cameras. Due to the fixed relationship of the cameras the positioning of the user's finger in the image may be used to determine the position using trigonometric principles. Other systems use a single camera having components capable of using time-of-flight techniques to resolve the distance to an object. In these systems, the distance is determined based on the speed of light and the amount of time it takes for a laser or light pulse to travel to the object and return. It should be appreciated that both the stereoscopic cameras and time-of-flight cameras are relatively specialized devices that need to be acquired by the user and may be costly.

A third type of interface system has been developed based on acoustics. These devices detect the noise generated by the touching (scratching) of the screen and the direction the noise originated from. In some instances the noise sensors are attached to the screen and detect the propagation of the sound waves in the screen substrate. Similar to the capacitance type touch devices, the acoustic systems generally need to be integrated into the device to function as desired.

SUMMARY

Embodiments include a method, system, and computer program product for determining the location of an object relative to a reflective surface. The method includes acquiring a first image of an object and the reflective surface with a camera, the camera positioned adjacent the reflective surface. It is determined when a dynamic element is displayed on the reflective surface. A second image is generated by subtracting the dynamic element from the first image. The object is identified in one of the first image and second image. A reflection of the object on the reflective surface is identified in the second image. Three-dimensional coordinates of at least a portion of the object are determined based at least in part on the identifying of the object and the identifying of the reflection of the object. This provides for removal of the dynamic element to avoid interference with identification of reflection image.

In an embodiment, the determination of when the dynamic element is displayed includes determining a time when the first image was acquired and determining a third image of the dynamic element being displayed at the time. This provides for identification of the dynamic element displayed at the time of image acquisition.

In an embodiment, the method further comprises generating a third image of the dynamic element at the same time the first image is acquired. This provides for simultaneous acquisition of images of the object and the dynamic element.

In an embodiment, the subtracting of the dynamic element from the first image includes subtracting a first plurality of pixel values of the dynamic element from a second plurality of pixel values of the first image. This provides for removal of the dynamic element from the first image on a pixel by pixel basis.

In an embodiment, the method further comprises further comprising defining a region in the first image based at least in part on a position of the object in the first image, the region being a portion of the first image. This provides for reducing the area were the image analysis is performed.

In an embodiment, the subtracting the dynamic element from the first image is performed in the region. This provides for reducing the analysis time for removing the dynamic element from the image.

In an embodiment, the method further comprises applying brightness and color distortion compensation and a blur filter to the first image. This provides for adjusting the first image to adjust for differences in light level and angle between the first image and the image of the dynamic element.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments of the present disclosure provide for a system and method for determining the location of an object such as a user's finger or another object that is near a reflective surface. Some embodiments of the present disclosure provide advantages in adding the capability of determining the position of a user's finger or the object to any reflective surface. Some embodiments of the present disclosure provide advantages in the capability of determining the position of the user's finger or the object using a single camera. Some embodiments of the present disclosure provide advantages in determining the capability of determining the position of the user's finger or the object using a mobile computing device, such as a cellular phone.

Figure 1:
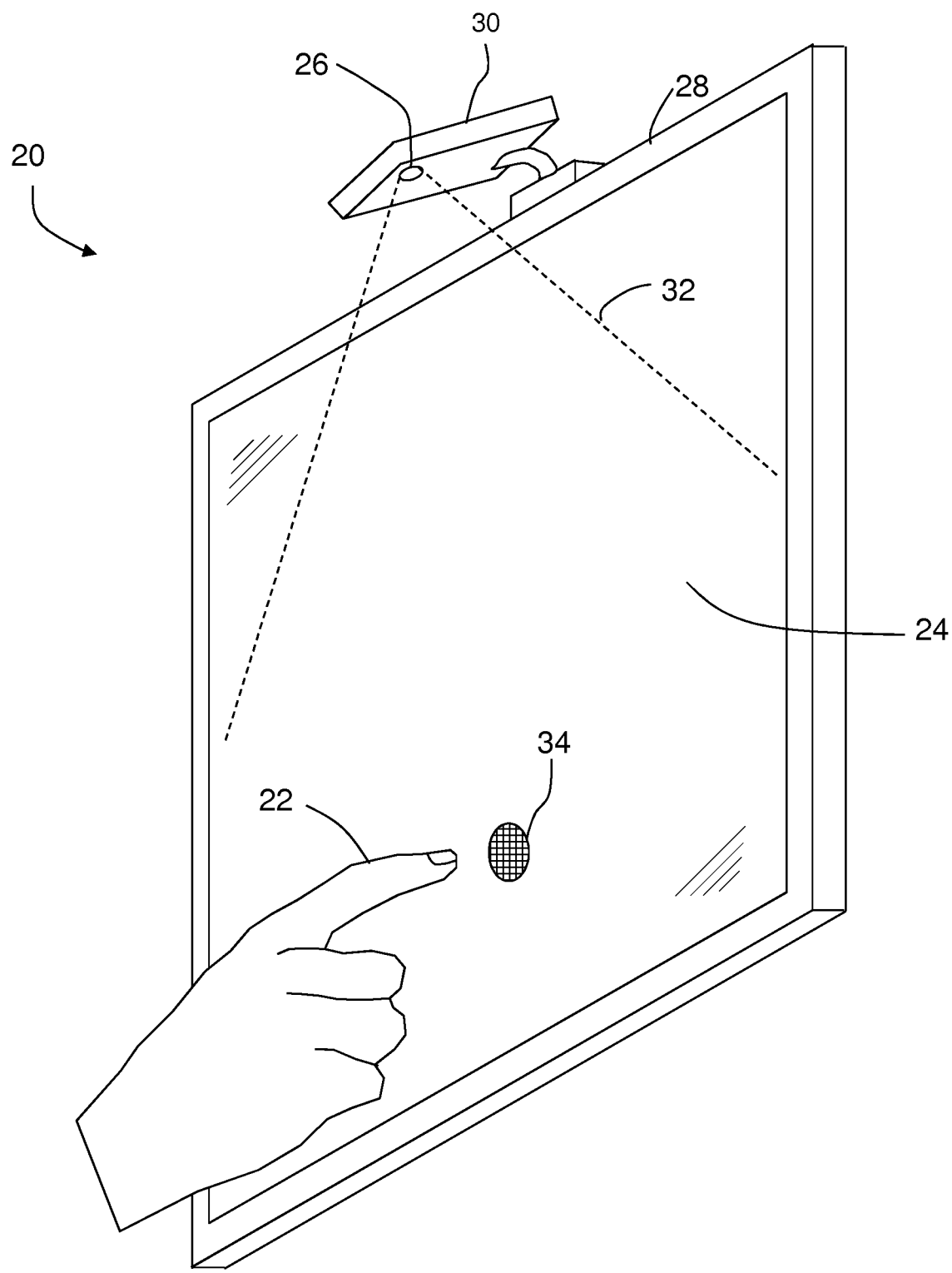
FIG. 1 depicts a perspective view of a system for determining a pre-touch interface for object location in accordance with some embodiments of this disclosure.

Referring now to FIG. 1 an embodiment of a system 20 for determining the position of an object, such as a user's finger 22 for example, relative to a reflective surface, such as a display screen 24 for example. It should be appreciated that while embodiments herein may refer to determining the position of a user's finger, this is for exemplary purposes and the claims should not be so limited. Some embodiments of the invention may determine the position of any object relative to the reflective surface; such objects include, but are not limited to pens, pencils, stylus, and erasers for example. Further, examples provided herein may describe the reflective surface in connection with a computing device or a graphical display screen for a computing device. However the claims should not be so limited. Some embodiments of the disclosure may be used with any reflective surface, such as but not limited to a mirror, a stone countertops, windows and whiteboards for example.

In an embodiment, the system 20 is a pre-touch interface that allows a user to interact with a computing device, such as a computer, a laptop, a tablet computer, a mobile computer, a cellular phone, a personal digital assistant, and LCD monitor or a television for example. In some embodiments, the pre-touch interface allows the user to control or interact with the computing device without touching the screen, surface or display. In some embodiments, this may provide advantages in allowing the user to interact with a computing device in an environment where contamination is of a concern, such as but not limited to a medical facility, a hospital, a doctor's office, a surgical center, a restaurant, a kitchen, a repair facility and an automotive garage for example.

The system 20 includes a camera 26 that is mounted adjacent to one edge 28 of reflective surface 24. In the exemplary embodiment, the camera 26 is incorporated into a mobile computing device, such as cellular phone 30. The cellular phone 30 is mounted on an angle such that the camera 26 field-of-view (FOV) 32 includes at least a portion of the reflective surface 24. In an embodiment, the FOV 32 incorporates substantially the entire operating portion of reflective surface 24. As used herein, the operating portion of the reflective surface 24 is the area of the reflective surface 24 that a user will interact with. For example, in the embodiment where the reflective surface 24 is a computer display screen, the FOV 32 may only be an area of the screen where graphical images, icons or input sections of the software are located.

In one embodiment, the images acquired by camera 26 are used by a computing device, such as cellular phone for example to determine where the user is pointing on the screen. As will be discussed in more detail herein, in response to determining the position of a portion of the user's finger, such as the tip of the user's finger for example, and the performing of a gesture (or lack of a gesture), such as hovering over a location for a predetermined amount of time or touching the screen for example, may cause the computing device to take a predetermined action, such as displaying a graphical marker 34 on the reflective surface or selecting an icon for example.

Figure 2:
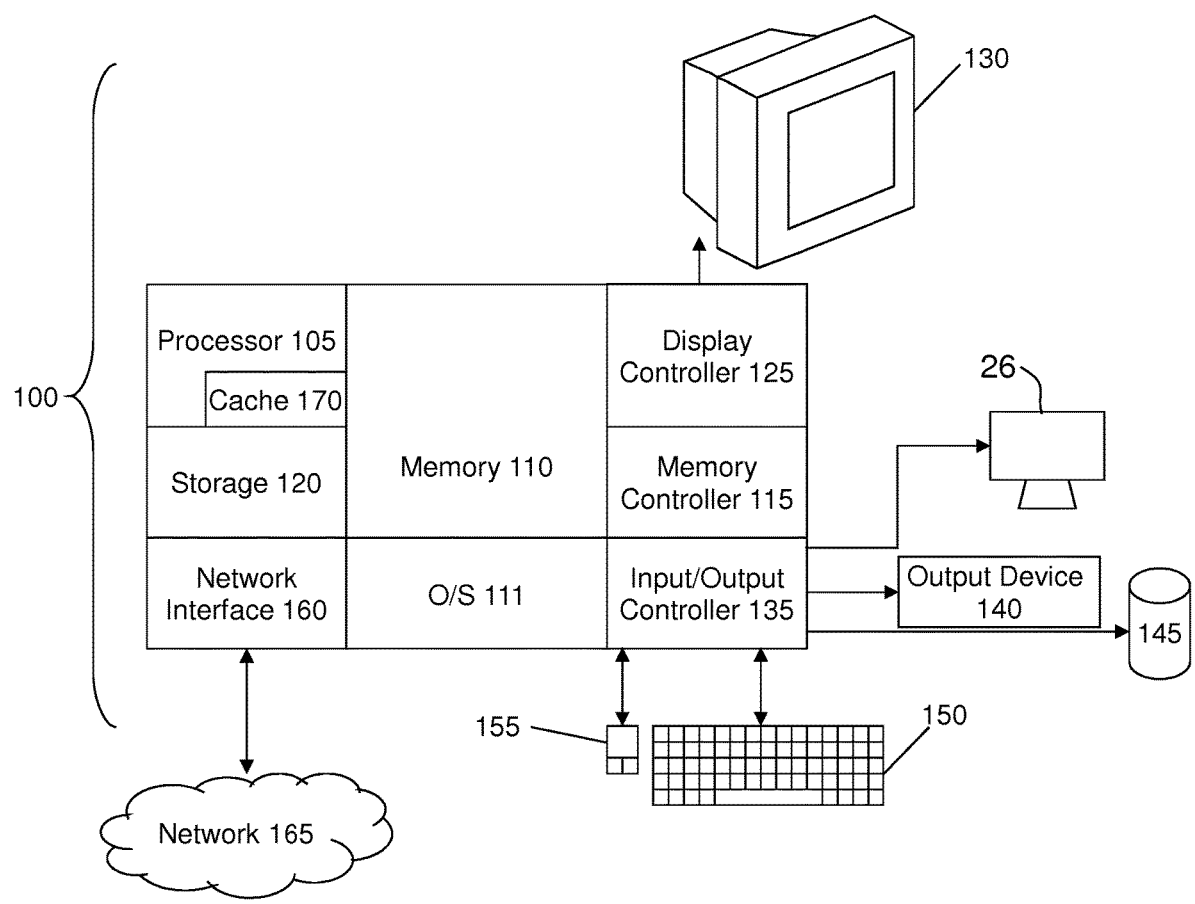
FIG. 2 depicts a block diagram of a computing device for implementing some or all aspects of the system, according to some embodiments of this disclosure.

Turning now to FIG. 2, a computing device 100 for use in determining the position of an object 22 relative to the reflective surface 24 is generally shown in accordance with an embodiment. FIG. 2 illustrates a block diagram of a computing device 100 for use in implementing a system or method according to some embodiments. The systems and methods described herein may be implemented in hardware, software (e.g., firmware), or a combination thereof. In some embodiments, the methods described may be implemented, at least in part, in hardware and may be part of the microprocessor of a special or general-purpose computing device 100, such as a cellular phone, a personal digital assistant (PDA), tablet computer, personal computer, workstation, minicomputer, or mainframe computer for example.

In some embodiments, as shown in FIG. 2, the computing device 100 includes a processor 105, memory 110 coupled to a memory controller 115, and one or more input devices 145, output devices 140 and/or camera 26, which are communicatively coupled via a local I/O controller 135. These devices 140, 145 may include, for example, a printer, a scanner, a microphone, and the like. Input devices such as a conventional keyboard 150 and mouse 155 may be coupled to the I/O controller 135. The I/O controller 135 may be, for example, one or more buses or other wired or wireless connections, as are known in the art. The I/O controller 135 may have additional elements, which are omitted for simplicity, such as controllers, buffers (caches), drivers, repeaters, and receivers, to enable communications.

The I/O devices 140, 145 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 105 is a hardware device for executing hardware instructions or software, particularly those stored in memory 110. The processor 105 may be a custom made or commercially available processor, a central processing unit (CPU), an auxiliary processor among several processors associated with the computing device 100, a semiconductor based microprocessor (in the form of a microchip or chip set), a macroprocessor, or other device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, etc.).

The memory 110 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, or other types of storage media. Note that the memory 110 may have a distributed architecture, where various components are situated remote from one another but may be accessed by the processor 105.

The instructions in memory 110 may include one or more separate programs, each of which comprises an ordered listing of executable instructions for implementing logical functions. In the example of FIG. 2, the instructions in the memory 110 include a suitable operating system (OS) 111. The operating system 111 essentially may control the execution of other computer programs and provides scheduling, input-output control, file and data management, memory management, and communication control and related services.

Additional data, including, for example, instructions for the processor 105 or other retrievable information, may be stored in storage 120, which may be a storage device such as a hard disk drive or solid state drive. The stored instructions in memory 110 or in storage 120 may include those enabling the processor to execute one or more aspects of the systems and methods of this disclosure.

The computing device 100 may further include a display controller 125 coupled to a display 130. In some embodiments, the computing device 100 may further include a network interface 160 for coupling to a network 165. The network 165 may be an IP-based network for communication between the computing device 100 and an external server, client and the like via a broadband connection. The network 165 transmits and receives data between the computing device 100 and external systems. In some embodiments, the network 165 may be a managed IP network administered by a service provider. The network 165 may be implemented in a wireless fashion, e.g., using wireless protocols and technologies, such as WiFi, WiMax, etc. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods according to this disclosure may be embodied, in whole or in part, in computer program products or in computing device 100, such as that illustrated in FIG. 2.

Figure 3:
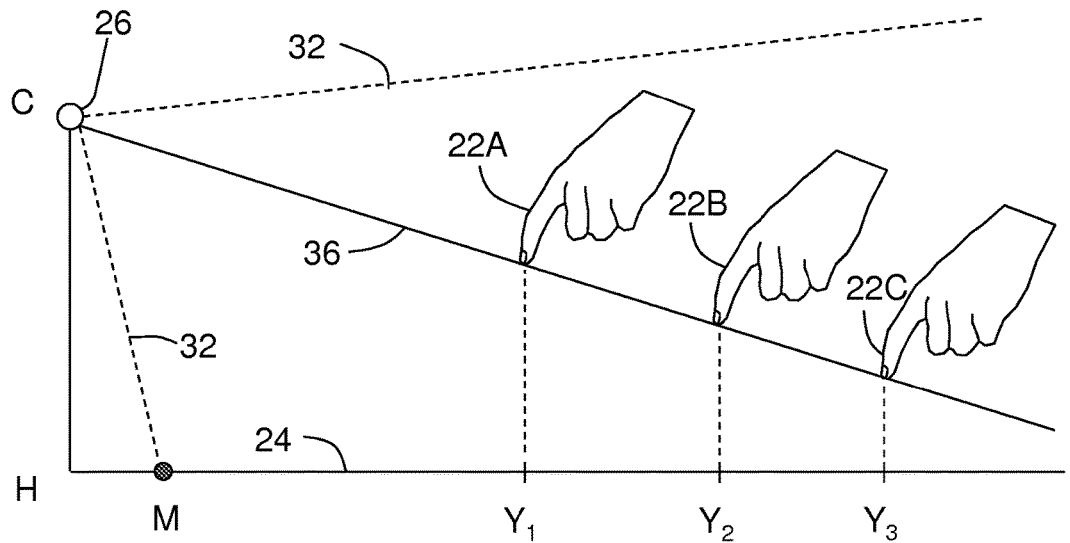
FIG. 3 depicts a schematic representation of a finger pointing at a surface in accordance with some embodiments of this disclosure.

Typically optical systems that determine the position of an object in space use either a stereoscopic arrangement where multiple cameras are arranged at different positions relative to the object, or use a pulsed laser or light source to measure the distance to the object based on the speed of light. With a stereoscopic camera arrangement, the different positions of the cameras allow the use of trigonometric principles to determine the distance based on the known arrangement (position and orientation) of the cameras relative to each other. Referring now to FIG. 3, it is shown position cannot typically be determined based on an image from a single camera. When the camera 26 acquires an image of the user's finger 22, there is uncertainty of the position of the finger 22 as it could lie at any distance along a line 36. Thus, from the image acquired by the camera 26, it is uncertain whether the finger 22 is at the position of finger 22A, finger 22B or finger 22C. Thus, without additional information the distance from the camera 26 to the finger 22 may not be ascertained.

Figure 4:
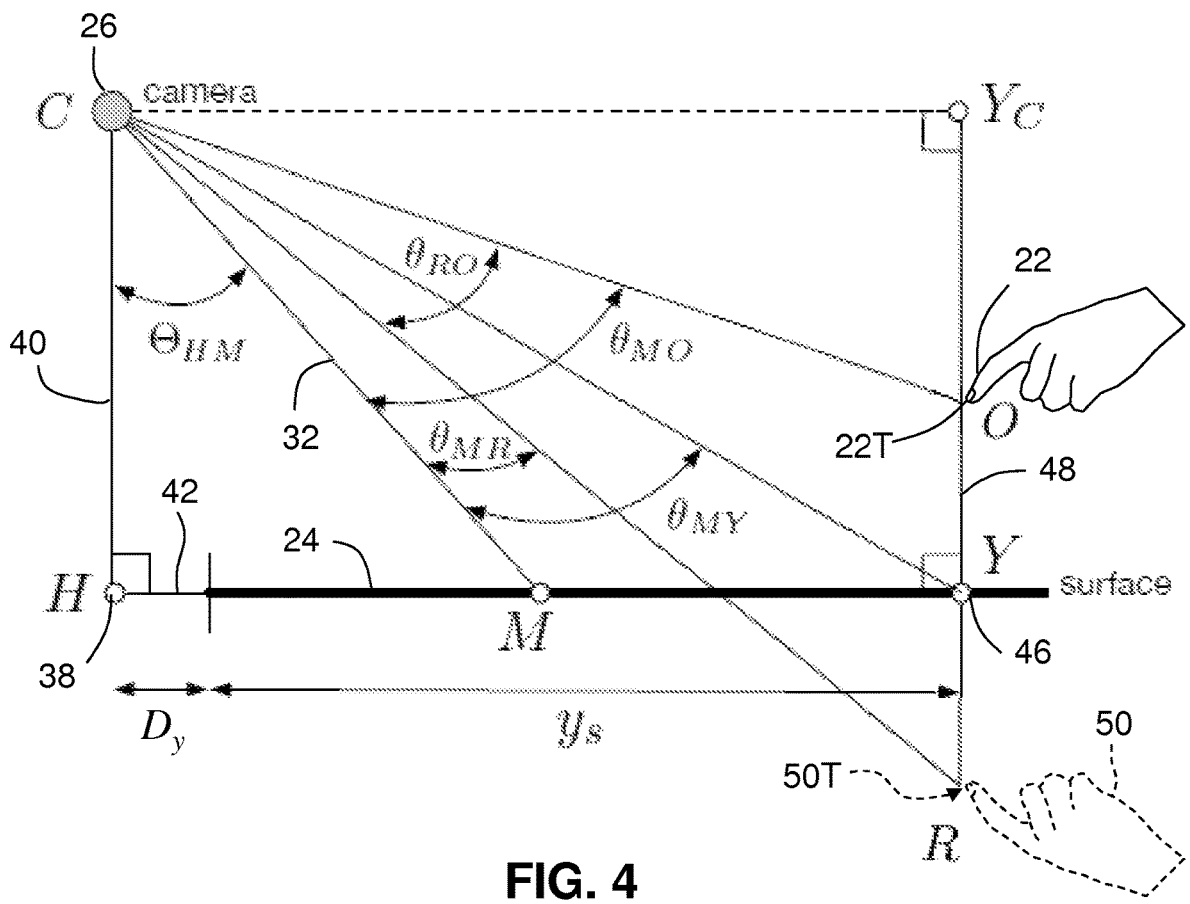
FIG. 4 depicts a schematic representation of a finger pointing at a surface and a reflection of the finger in accordance with some embodiments of this disclosure.

Turning now to FIG. 4, an embodiment will be described for determining the distance from the camera 26 to the finger 22 using a single standard camera. As used herein, the term standard camera means an imaging device that acquires an image within the field of view and does not include a laser or light source that determines the distance to an object based on the speed of light. For purposes of determining where the user is pointing on the surface 24, the location of the fingertip 22T is first identified in the acquired image acquired by the camera 26. As will be discussed in more detail herein, the reflection 50 is a reflection of the finger 22 on the surface 24. The reflection fingertip 50T in the reflection image is also identified. As used herein, the local coordinate frame of reference for determining the X, Y, Z coordinates of the fingertip 22T has an origin H. The origin H is located at the intersection point 38 of a line 40 that extends perpendicular to the reflective surface 24. The Y axis is along a line 42 extending from the origin along the reflective surface 24 that is perpendicular to the line 40. The X axis 44 (FIG. 5) extends from point 38 perpendicular to the Z axis 40 and the Y axis 42. In an embodiment where the reflective surface 24 is a display screen, the X-axis 44 may extend parallel to or collinear with the top edge of the display and the Y axis 42 extends parallel to the side of the display.

Initially, the Y coordinate of point 46 on the surface 24 is determined. Point 46 is the location on the surface 24 that is closest to the fingertip 22T. In other words, the point 46 lies along a line 48 that extends perpendicular to the surface 24 and extends to the fingertip 22T. It should be appreciated that the line 48 also extends between the fingertip 22T and the reflection fingertip 50T due to reflective symmetry. If it is assumed that the fingertip 22T is aligned with the Y axis 42, meaning that the X coordinate Xco, Xcr of the fingertips 22T, 50T is zero, then the distance ys from the edge of the surface 24 may be expressed as:

$$y_s = \overline{HC} \tan(\Theta_{HM} + \Theta_{MY}) - D_y \quad (1)$$

Where the distance HC is the height along line 40 between the lens of camera 26 and the surface 24. To obtain the unknown angle $\theta_{MY}$, the relationship of reflection symmetry is used to determine that distance OY along line 48 is equal to the distance RY. In other words then distance from the fingertip 22T to the point 46 is the same as the distance from the reflection fingertip 50T to the point 46. As a result, ½ $(RY_C-OY_C)=RY_C-YY_C$, which can be expressed by:

$$\frac{1}{2}(\tan\theta_{RY_c}-\tan\theta_{OY_c})=\tan\theta_{RY_c}-\tan\theta_{YY_c} \quad (2)$$

Where $\theta_{YYC}=\pi/2-(\Theta_{HM}+\theta_{MY})$, $\theta_{RYC}=\pi/2-(\Theta_{HM}+\theta_{MR})$, and $\theta_{OYC}=\pi/2-(\Theta_{HM}+\theta_{MO})$. As a result, Equation (2) is equivalent to:

$$\tan\theta_{YY_c}=\frac{1}{2}(\tan\theta_{RY_c}+\tan\theta_{OY_c}) \quad (3)$$

Using the definition of $\theta_{YYC}$ from above in Equation (3) provides:

$$\theta_{MY}=\frac{\pi}{2}-\Theta_{HM}-\arctan(\tan\theta_{RY_c}+\tan\theta_{OY_c}) \quad (4)$$

Therefore, the distance $y_s$ from the edge of the surface 24 to the point 46 may be evaluated using Equations (1) and (4). The angles $\theta_{MR}$ and $\theta_{MO}$ may be obtained by assuming an ideal pinhole camera without nonlinear distortion, which provides the following relation for $\theta_{MR}$:

$$\theta_{MR}=\arctan\left(\frac{y_{cr}}{Y_{FOV}/2}\tan\frac{\Theta_v}{2}\right) \quad (5)$$

where $Y_{FOV}$ is the vertical length of the camera's full field of view 32, and $\Theta_v$ is the vertical angle of the camera relative to the reflective surface 24. In an embodiment, a radial distortion correction may be approximated using a polynomial expression as is known in the art. The radial distortion is a deviation from rectilinear projection, which is a projection in which straight lines in a scene remain straight in the acquired image due to non-ideal curvature of the camera lens. Radial distortion is an optical aberration in the lens and may be categorized as a barrel distortion, a pin-cushion distortion, or a combination thereof. In some embodiments, correcting for radial distortion provides advantages in reducing localization errors at outer regions of the camera's field of view. In an embodiment, the polynomial expression includes parameters in terms of focal length. In this embodiment, the focal length was fixed and any auto-focus feature of the camera was disabled.

Figure 5:
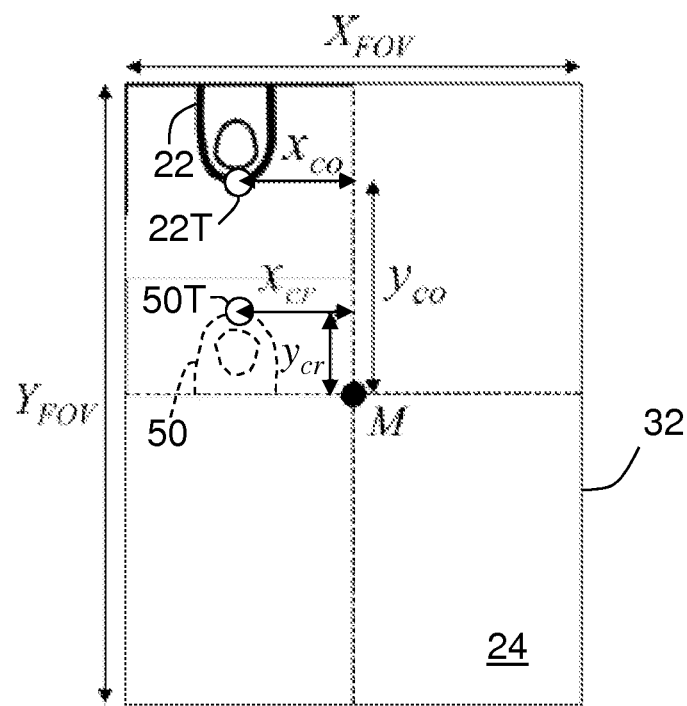
FIG. 5 depicts a plan view of the fingers and surface of FIG. 4.
Figure 6:
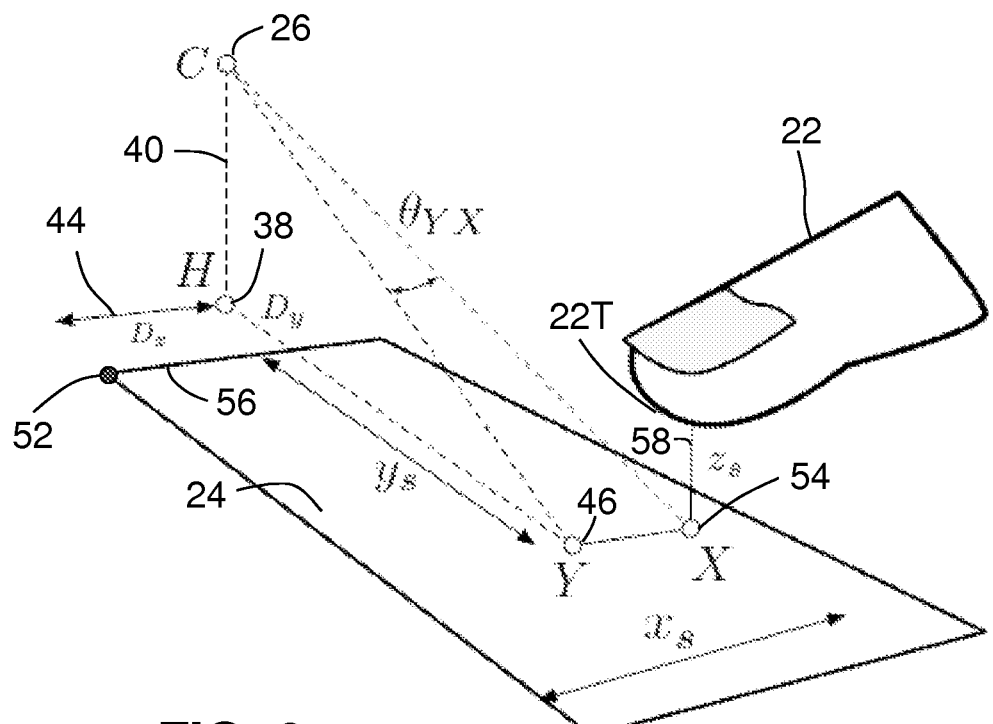
FIG. 6 depicts a schematic perspective view of the finger and surface of FIG. 4.

A generalized case is shown in FIG. 5 and FIG. 6 where the X coordinate $X_{co}$, $X_{cr}$ for the fingertips 22T, 50T is not zero. Once the Y coordinate $Y_s$ is determined, the X coordinate $x_s$ and Z coordinate $z_s$ to the fingertip 22T may be found. It is noted, that for convention purposes, the local frame of reference origin is transformed to the corner point 52 of the surface 24. Thus the point 38, which is defined in terms of the camera 26 position, is offset from the point 52 by a distance $D_x$, $D_y$. Thus the position $x_s$ is the distance or x-position along the line 56 to the point 54, where the line 56 is parallel to or collinear with the line 44. The position $z_s$ is the vertical distance from the point 54 along a line 58, where the line 58 is parallel to the line 40.

It should be appreciated that the point 52 is an arbitrary position for the origin of the local frame of reference, but may be a convenient location in an embodiment where the reflective surface 24 is a display screen as this would allow for the transformation of the x, y coordinates of point 46 into a pixel location on the display screen. As will be discussed in more detail below, the pixel location may be compared with images (e.g. icons) displayed on the screen to determine when a pre-determined action associated with the displayed image should be performed.

It is noted that the distance $z_s$ is equal to the distance OY along line 48 (FIG. 4). As such, $z_s=Y_{YC}-O_{YC}$. Therefore, this difference may be expressed as:

$$z_s=(y_s+D_y)(\tan\theta_{YY_C}-\tan\theta_{OY_C}) \quad (6)$$

Thus $z_s$ may be found using Equation (4) and the definitions of $\theta_{YYC}$ and $\theta_{OYC}$ provided above. With $y_s$ and $z_s$ determined, $x_s$ may be expressed using the Pythagorean theorem:

$$x_s=\sqrt{\overline{HC}^2+(y_s+D_y)^2}\tan\theta_{YX}+D_x \quad (7)$$

Wherein the expression $\theta_{YX}$ is analogous to Equation (5) in terms of $x_{cr}$, $X_{FOV}$, and $\Theta_h$. Where the term $\Theta_h$ is the horizontal angle of the camera relative to the reflective surface 24.

It should be appreciated that in one embodiment, the identification of, and the determination, of the position of the fingertips 22T, 50T may be performed by analyzing images acquired by the camera 26 and by extracting the fingers 22, 50 from the acquired image. In one embodiment, the identification of the finger 22 is performed by extracting image objects that have a color value that proximately matches the color range of human skin. In another embodiment, the extraction was performed by comparing successive images acquired by the camera 26 and determining differentials between the images as a means of identifying movement. A threshold for motion was defined to allow identification of objects that moved between frames. It was found that the process of comparing successive images and determining motion provided additional advantages in reducing the susceptibility to background objects.

In one embodiment, once the finger 22 was identified, a heuristic process was used whereby the finger 22 is tracked between subsequent successive image frames. This provided advantages in making the process of locating the position of the fingertips 22T, 50T more efficient. It should be appreciated that as a result, the processing power used to calculate the position of the fingertip 22T was reduced.

In another embodiment, within the differential areas of the acquired images (e.g. the areas of the images where movement was detected) were filtered to determine a convex hull enclosing the contour of an object in the image. As used herein the term "convex hull" is a convex polygon representing a shape, such as the curved end of a finger for example. In an embodiment, the convex hull is defined as the smallest convex set enclosing the given points. The convex set is defined as a fully enclosed region such that, for every pair of points within the region, the straight line connecting the two points also fully resides within the region. In the exemplary embodiment, a convex hull indicates the smallest convex set enclosing the contour of an object in the image. When the convex hull was larger than a defined size threshold, the object was identified as a finger. As a result, it was found that accuracy of the identification process was improved. Further it was found that other long-shaped objects, such as pens for example, could be identified with a desired level of accuracy.

In an embodiment, the finger 22 is first identified in the acquired image. Subsequently, using the identification of the finger 22, the reflected finger 50 is identified in the image. In an embodiment, the tangential point of the finger 22 closest to the surface 24 is identified as the fingertip 22T. A narrow rectangular area (the "Region of Interest) is then defined based on 25% of the image area. In an embodiment, the Region of Interest may be defined differently based on the viewing angle of the camera 26 or the sized of the identified finger 22. In still another embodiment, the size of Region of Interest is dynamically changed based at least in part on the identified distance between the finger 22 and the camera 26. The Region of Interest extends from the location of the identified fingertip 22T towards the opposite side of the image. In other words, the Region of Interest extends from the fingertip 22T towards the surface 24 within the image. Then using the convex hull process discussed above, the reflected finger 50T is identified based on the shape of the reflected fingertip. In embodiments where movement is detected between image frames, the Region of Interest is defined that is centered at the previously detected location within the field of view. The analysis to identify the reflected fingertip 50T is then performed within the Region of Interest.

In an embodiment, such as under low light luminosity conditions, random noise artifacts were found in some images due to the camera 26 ISO settings. In an embodiment, filtering such as blur filtering was used to reduce higher noise artifacts. Further, it was found that improved reliability could be achieved in identifying motion by increasing the differentials between images. This could be achieved by determining the difference between the current frame and a frame earlier in time than the immediately previous frame. In an embodiment the comparison for differentials was performed on the current image from and an image located four frames previously. In another embodiment, a ten-frame weighted moving average of the differential was used to smooth the trajectory of the moving object in the images. From the ten points of those frames, the largest noise artifacts could be removed. It should be appreciated that in an embodiment where images are acquired at a rate of 30 frames per second, the movement of the object is still being evaluated several times per second.

It should be appreciated that the higher the resolution, the more improvement in accuracy was approved. However, higher resolutions also utilize the more processing power. As a result, for a given computing device the higher the resolution the more time it would take to perform the analysis. In the exemplary embodiment using a cellular phone for acquiring the images and determining the position of the user's finger, a 320×240 pixel camera resolution was selected and the Region of Interest was selected to be 25% of the area. The images were acquired at a rate of 30 frames per second. The accuracy of the system 20 was tested using a cellular phone with circles (target points for the user) having 5 mm diameters and spaced 15 mm apart on the X and Y axis. In the testing of 18 subjects, an average error (Euclidean distance from reference point) of 3.31 mm with a standard deviation of 2.35 mm. This system was also tested using a 50 inch (1270 mm) LCD television where the mounting angle $\Theta_{HM}$ was 73.5 degrees relative to the television surface. In the television test, the average error was 10.07 mm with a standard deviation of 21.08 mm. It should be appreciated that the error size relative to the screen size is small. It should also be appreciated that in both the cellular phone test and the television test, some of the error was due to the users not holding their finger with precision relative to the target points.

In one embodiment, the system 20 includes a process for determining the closest target to the location where the user's finger is hovering. In this embodiment, when the system 20 determines that the user's finger is hovering, the Euclidean distance from the point on the reflective surface where the finger is pointing to the each of the nearest target points. The system 20 then changes the determined $x_s$, $y_s$, $z_s$ to that corresponding to the nearest target point. This is sometimes colloquially referred to as a "snap-to-grid" feature. During testing, when the snap-to-grid feature was enabled, the cellular phone test only incurred a 2.77% misclassification of the target point (8 out of 288 sampled) and with the television there was only a 0.33% misclassification (1 out of 306 sampled).

Testing was performed to determine the accuracy of the Z-coordinate determination using the cellular phone and the same target circle pattern discussed above. For each target, the user held their finger at 10 mm, 30 mm and 50 mm. It should be appreciated that the Z-coordinate could only be determined where the fingertip was within the camera's vertical field of view. For some targets, particularly those closest to the camera, only the 10 mm height could be measured. The average error at the 10 mm height was 1.02 mm with a standard deviation of 0.69 mm. At the 30 mm height the average error was 1.04 mm with a standard deviation of 0.7 mm. At the 50 mm height, the average error was 1.38 mm with a standard deviation of 1.22 mm. Thus the vertical height position may be determined with a high level of accuracy.

It should be appreciated that the determination of $x_s$, $y_s$, $z_s$ may be performed by a mobile device (e.g. a cellular phone), using a single standard digital camera. In an embodiment, a reflective surface 24 may be adapted to interact with an external object by mounting a mobile device or a digital camera coupled to a computing device adjacent to one edge of the reflective surface. In some embodiments, advantages may be provided by the system 20 in allowing users to interact with a computing device without having to contact the surface of the computing device. Thus, the user can use the computing device without contaminating either the surface of the computing device (e.g. contamination from the user to the surface) or contaminating their hand (e.g. contamination from the surface to the user). In some environments, such as a medical facility, a kitchen or an automotive repair facility, the system 20 may allow the users to interact with the computing device without extensive cleaning procedures or risking damage to the computing device display.

Figure 7:
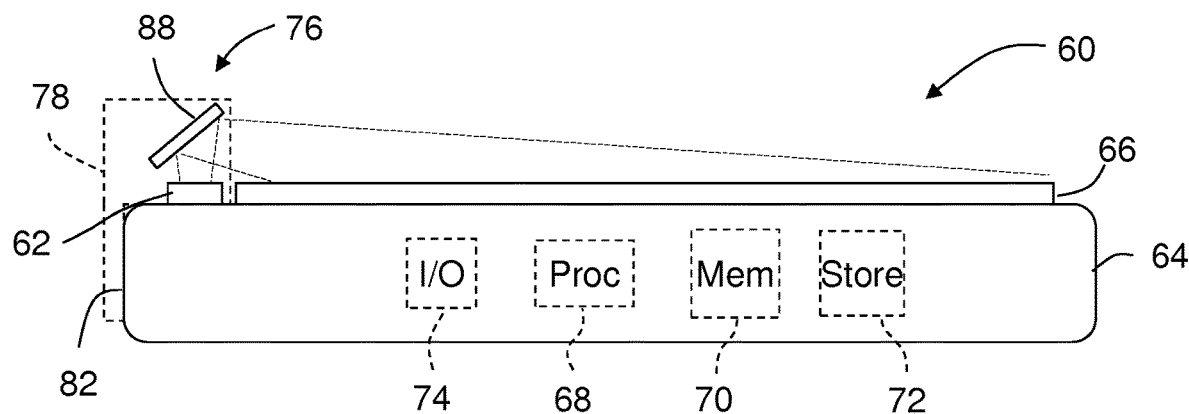
FIG. 7 depicts a side view of a system having a pre-touch interface for object location in accordance with another embodiment of this disclosure.
Figure 8:
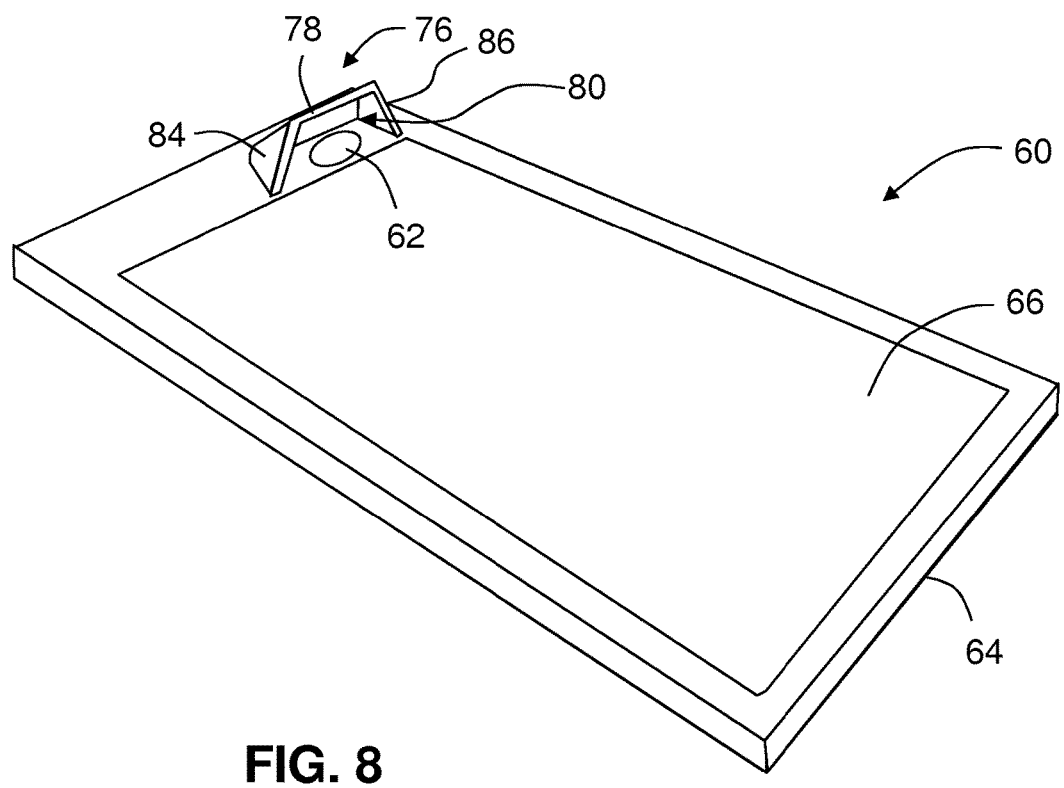
FIG. 8 depicts a perspective view of the system of FIG. 7.

Referring now to FIGS. 7 and 8, an embodiment is illustrated for enabling a cellular phone device 60 to have a pre-touch interface using the built in front facing camera 62. The cellular phone device 60 includes a housing 64 having a display screen 66, such as an LED or OLED type screen for example, on one side. The front facing camera 62 is arranged on the same side as the display screen 66. The cellular phone device 60 further includes processing circuitry, such as that described herein regarding computing device 100. In an embodiment, the cellular phone device 60 includes a processor 68, memory 70, storage 72 and an input/output controller 74. The input/output controller 74 is coupled to the camera 62 for acquiring image signals therefrom. Processor 68 includes operation control methods embodied in application code such as that shown in FIGS. 9-11 for example. These methods are embodied in computer instructions written to be executed by processor 68, such as in the form of software. In an embodiment, the cellular phone device 60 includes a computer program software that is stored in memory 70 and is responsive to signals from the camera 62 to detect and determine the position an external object, such as a user's finger or a pen for example, as described herein.

It should be appreciated that the front facing camera 62 receives light from a direction perpendicular to the display surface 66. In an embodiment, the cellular phone device 60 includes a mirror assembly 76. The mirror assembly 76 may be removably coupled to the housing 64 to allow the user to switch between using the camera 62 for the pre-touch interface and for taking photographs. In an embodiment, the mirror assembly 76 includes a housing 78 having an open side 80 adjacent the display surface 66. The housing 78 may couple to the end 82 of the housing 64. In an embodiment, the housing 78 may be coupled to the end 82 by a hinge member that allows the user to rotate the mirror assembly 76 out of the way so as to not interfere with taking photographs. In an embodiment, the movement of the mirror assembly 76 may be determined from the images acquired by the camera 62 and the pre-touch interface may be automatically disabled.

In an embodiment, the housing 78 includes sidewalls 84, 86 that are arranged to limit the field of view of the camera 62. It should be appreciated that in some embodiments, the sidewalls 84, 86 reduce the processing of the images acquired by camera 62 since the portion field of view that is analyzed to identify the user's finger is reduced and presence background images will be limited.

Disposed within the opening 80 is a mirror 88. The mirror 88 is disposed adjacent to the camera 62 and on an angle relative to the camera and reflective surface. In an embodiment, the mirror angle is 30-45 degrees with respect to the reflective surface. It should be appreciated that other angles may also be used to provide a desired camera field of view over the reflective surface. The angle of the mirror 88 is arranged to reflect light from the display surface 66 into the camera 62. Thus, the mirror 88 allows the image of the user's finger and the reflection of the user's finger to be acquired by camera 62 for use in the pre-touch interface described herein.

It should be appreciated that while embodiments herein describe the mirror assembly 76 as being removable, the claims should not be so limited. In other embodiments, the mirror assembly 76 is coupled integrally with the housing 64. Further still in other embodiments, the camera 62 is disposed within the housing 78 to directly acquire the image of the user's finger and the reflection.

Figure 9:
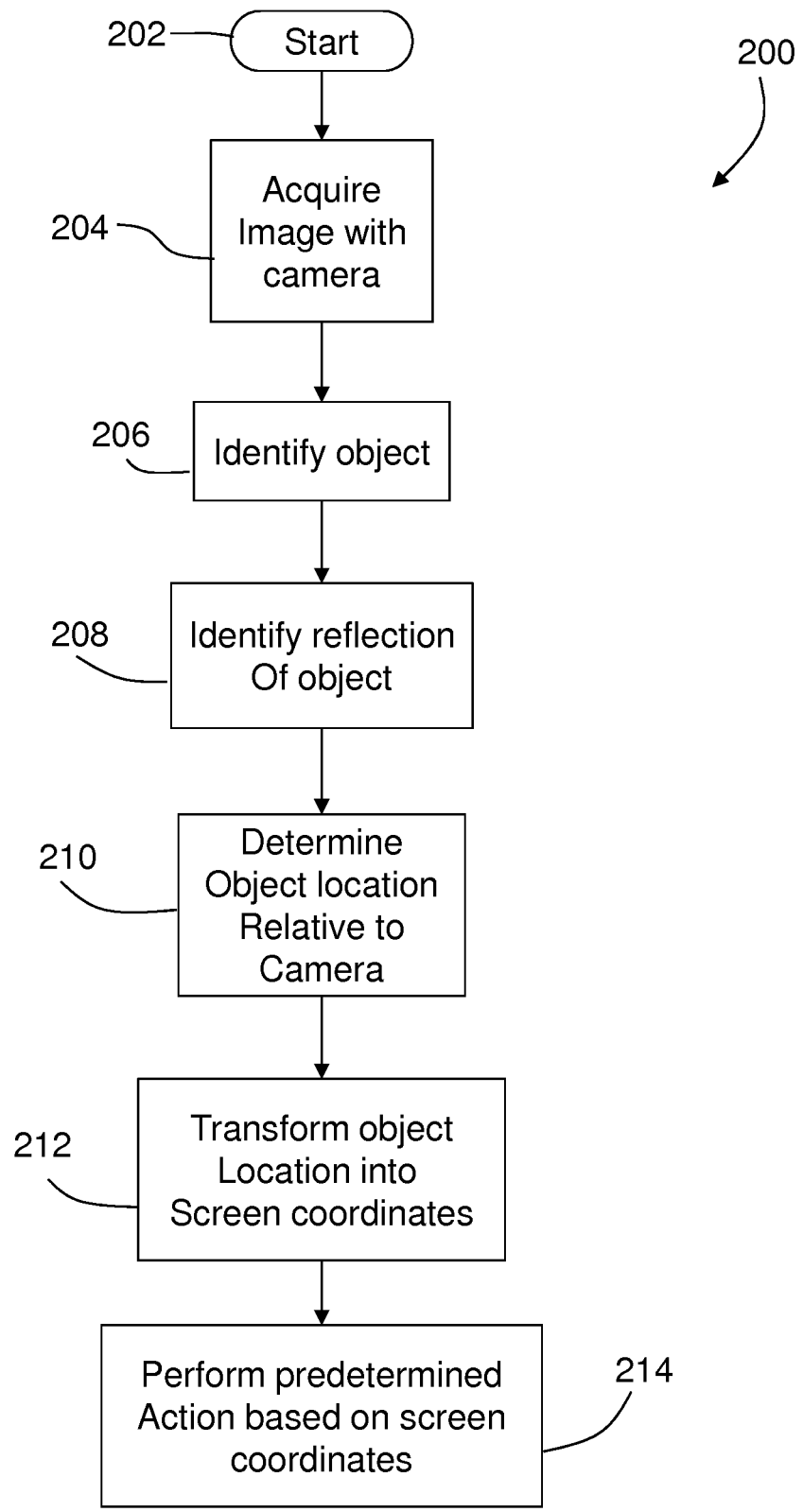
FIG. 9 depicts a flow diagram of a method of determining a pre-touch object location in accordance with some embodiments of this disclosure.

Referring now to FIG. 9 an embodiment is shown of a method 200 for operating an interface to determine pre-touch localization relative to a reflective surface. It should be appreciated that the method 200 may be used with a computing device (e.g. a cellular phone, a television, a computer) or a non-computing reflective surface (e.g. a mirror or stone counter). In this embodiment, the method 200 starts in block 202 and proceeds to block 204 where an image is acquired with a camera, such as camera 26 for example. In an embodiment, the image is acquired with a resolution of 320×240 pixels. The process 200 then proceeds to block 206 where an interface object, such as a user's finger or a pen for example, is identified. In one embodiment, the object may be identified using the convex hull process described herein. The identification of the object may also include identifying the tip or end of the object (e.g. the fingertip or object end), such as by identifying the vertex or end-most tangent point of the object.

With the object identified as a pointing or interface object, the method 200 proceeds to block 208 where a reflection of the identified object is identified in the acquired image. In an embodiment, the identification of the object reflection includes defining a Region of Interest and analyzing the shapes within the Region of Interest to have a shape similar to the identified object. The method 200 then proceeds to block 210 with the location of the object relative to the camera is determined based at least in part on acquired image, the identified object and the identified reflection of the object. In an embodiment, the determination of the location of the identified object may include two orthogonal coordinates of a point on the surface that is closest to the identified object or the tip or end of the object. In an embodiment the determination of the location of the identified object may further include a height coordinate that represents the distance from the surface to the tip or end of the object.

The method 200 then proceeds to block 212 where the location of the identified object is transformed from the camera coordinate system into a local coordinate system of the pre-touch interface or the surface. For example, in the embodiment where the pre-touch interface is used with the display of a computing device, the local coordinate system may be the vertical and horizontal pixels on the screen. In an embodiment where the pre-touch interface is used with a non-computing surface/device, the local coordinate system may be in relation to physical features of the surface, such as relative to the top and a side of a mirror or counter for example. It should be appreciated that while embodiments herein describe the determination of the object location relative to the camera and then transforming the location coordinates into a local coordinate frame of reference, this is for clarity purposes and blocks 210 and 212 may be performed simultaneously or in a single step. Further, in an embodiment, the step of transforming the location into a local frame of reference is omitted and method 220 proceeds based on the camera frame of reference.

The method 200 then proceeds to block 214 where a predetermined action is performed based on the location of the object and the determined coordinates in the local frame of reference. In the embodiment where the pre-touch interface is used with a computing device, the location of the object may be determined based on the pixel location on the screen. The computing device may then compare the pixel location to the image being displayed on the screen. When the pixel location matches a target location in the displayed image, such as an icon for example, the computing device may, in response, perform pre-determined methods that are embodied in computer instructions written to be executed by a processor (e.g. software).

In an embodiment where the pre-touch interface is used with a non-computing reflective surface, the predetermined action may be a mechanical or electromechanical process communicating with or controlling one or more external devices. Examples include but are not limited to turning on lights on areas of a countertop or playing music from a nearby speaker when the user points at a predefined area on the reflective surface for example.

Figure 10:
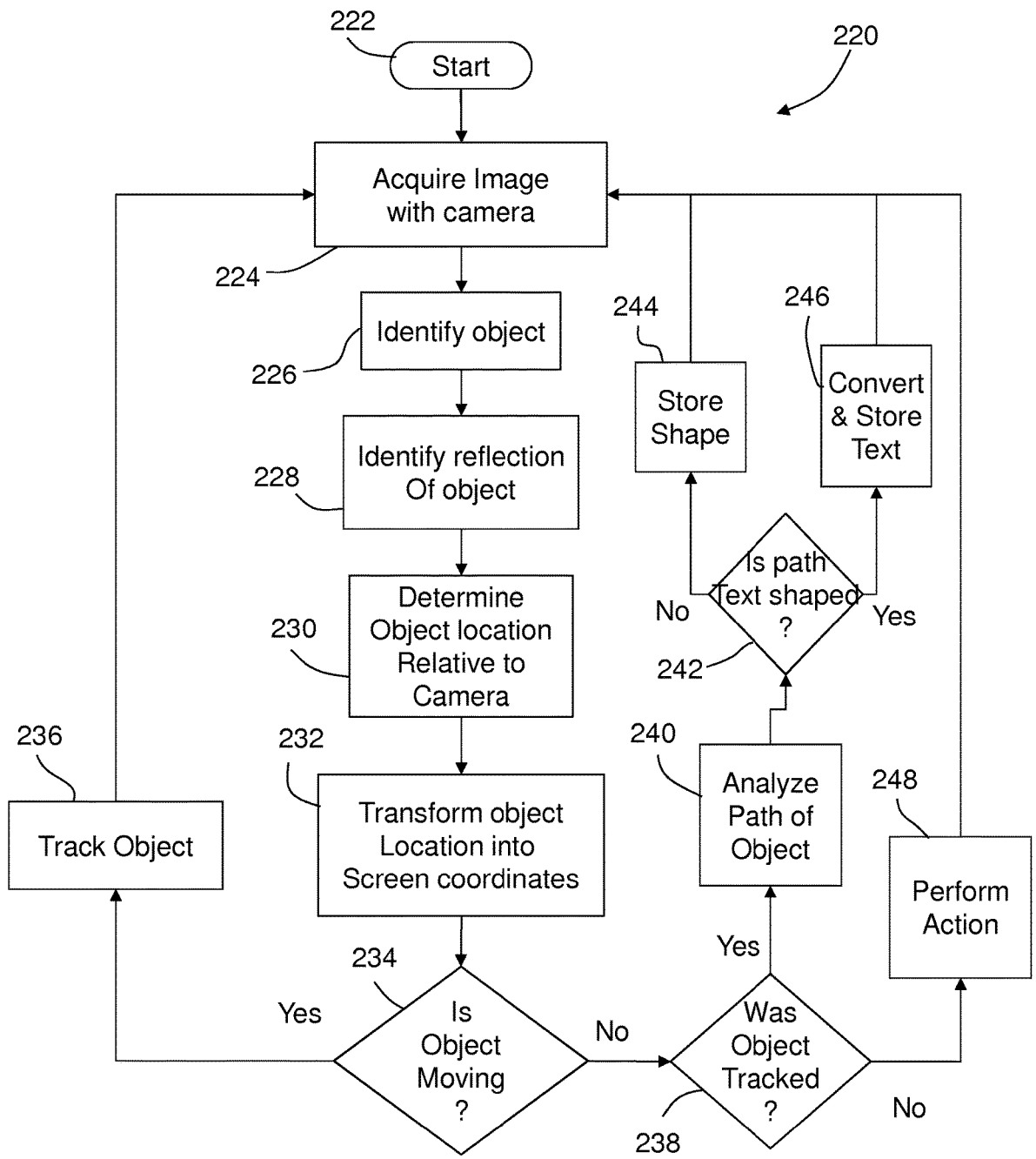
FIG. 10 depicts a flow diagram of a method of determining a path of an object a pre-touch object location in accordance with some embodiments of this disclosure.

Referring now to FIG. 10, a method 220 is shown for tracking a path of an object using a pre-touch interface. The method 220 starts in block 222 and proceeds to block 224 where an image that includes the reflective surface is acquired. The method then proceeds to block 226 where the object (e.g. the user's finger or pen) is identified as discussed herein. In block 228, the reflection of the object is identified and the location of the object is determined in block 230 as discussed herein. An optional step of transforming the object location into a local frame of reference may be performed in block 232. The method 220 then proceeds to query block 234 where it is determined when the object is moving relative to the reflective surface.

As discussed herein, the movement of the object may be used to improve the accuracy of the object identification and in some embodiments improve processing speed. However, the movement of the object may also be a means of inputting information and data or otherwise interact with a computing device. In this embodiment, when it is determined that the object is moving, the query block 234 returns a positive and proceeds to block 236 where the position of the object is tracked and stored. The method then loops back to block 224. In an embodiment, the tracking of the object may be in response to an input from or action by the user (e.g. the user selects an icon).

When the object stops moving, the method 220 proceeds to query block 238 where it is determined whether the object was previously being tracked. When query block 238 returns a negative, meaning that the object was not being tracked, the method 220 proceeds to block 248 and performs a predetermined action as discussed herein. The method 220 then loops back to block 224.

When the query block 238 returns a positive, meaning that the object was being tracked, then the method 220 proceeds to block 240 where the path or shape of the path is analyzed. In query block 242, it is determined when the shape of the path is text shaped. When query block 242 returns a positive, meaning that the path shape indicates textual input by the user, the method 220 proceeds to block 246. In block 246, the method 220 analyzes the shape of the path and converts the shape into textual data that is stored. In one embodiment, the method 220 utilizes optical character recognition (OCR). OCR is a process whereby images of typed, handwritten or printed text are converted using a pattern recognition or image correlation process into machine-encoded text. Once stored as machine-encoded text, the user may edit, search or otherwise use the text as if it had originally been entered via another input device, such as a keyboard for example. With the machine-encoded text stored, the method 220 loops back to block 224

When the query block returns a negative, meaning the shape of the path does not indicate textual content, the method 220 proceeds to block 244 where the shape of the path is stored, such as in an electronic graphical format for example. The shape may be a drawing or sketch made by the user. In an embodiment, the path may include multiple shapes or a mixture of textual and graphical content. In this embodiment, the method 220 may bifurcate the shapes into graphical elements and textual elements. The graphical elements are stored in a graphical format while the textual elements are stored as machine encoded text. In an embodiment, the graphical elements and the machine-encoded text may be stored in a file format that preserves the relative positioning of the textual elements and graphical elements on the reflective surface. In some embodiments, this may provide advantages in capturing information that includes sketches and text from a whiteboard and displaying the captured information in the same format/layout as it was originally written for example.

Figure 11:
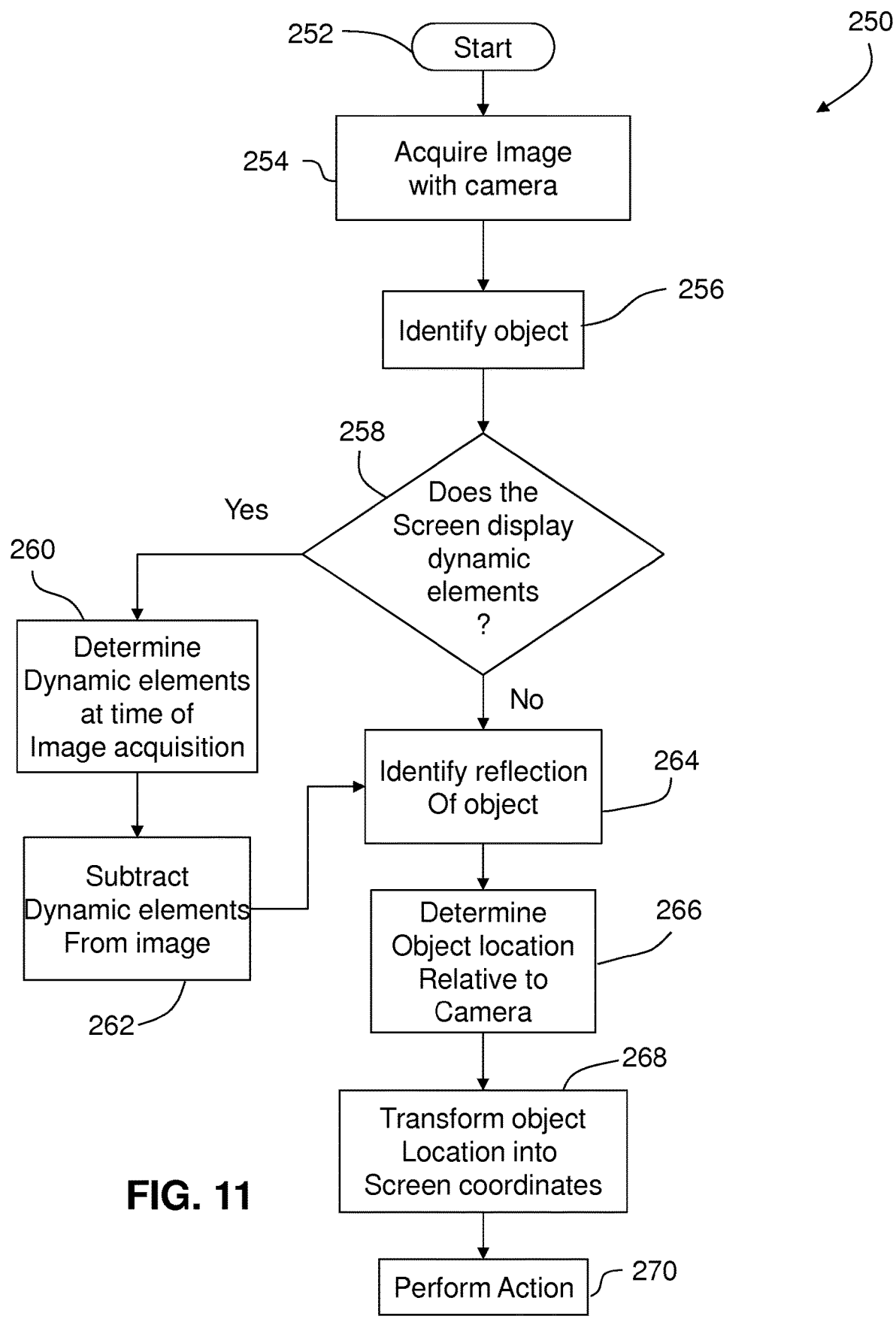
FIG. 11 depicts a flow diagram of a method of identifying an object us a pre-touch object location on a screen having dynamic images in accordance with some embodiments of this disclosure.

As discussed herein, the identification of the reflection of the object may be more difficult in embodiments where the reflective surface is a display screen that is also displaying media having moving or dynamic elements such as a video or movie. The movements within the media may obscure or dynamically change the visibility of the reflection to the camera and thus potentially reduce the accuracy of the reflection identification. The dynamic elements may also include movement that increases the analysis performed when determining differentials between image frames. Further, the dynamic elements may include shapes that are similar to the convex hulls used to identify the object. Turning now to FIG. 11, a method 250 for identifying the object reflection when the display screen includes dynamic images or elements. It should be appreciated that while embodiments herein may refer to the dynamic elements as being video images, this is for exemplary purposes and the claims should not be so limited. The method 250 starts in block 252 and proceeds to block 254 where an image that includes the reflective surface is acquired with a camera, such as camera 26 for example. In an embodiment, the acquisition of the image also includes additional non-image data, sometimes referred to as meta-data. This meta-data may include the time at which the image was acquired. In other embodiments, the meta-data may include additional information, such as the date, a geographic position, or an orientation of the camera at the time the image was acquired. The method 250 then proceeds to block 256 where the object is identified in the acquired image as discussed above.

The method 250 then proceeds to query block 258 where it is determined if the reflective surface includes dynamic elements such as a video. It should be appreciated that dynamic elements may interfere with the locating and identification of the object reflection. In embodiments where the movement within the acquired image is used to improve accuracy in identifying the location of the reflection, the dynamic elements may cause false indication of movement. In an embodiment, the method 250 further determines in query block 258 if the dynamic elements are located within, or adjacent to, the Region of Interest. When the query block 258 returns a positive, meaning that the dynamic elements may interfere with the identification of the reflection of the object, the method 250 proceeds to block 260 where it is determined what dynamic element (e.g. what video image) was being displayed at the time the acquired image was recorded. In an embodiment, this is done by comparing the time meta-data of the acquired image with that of the video. In an embodiment, the method 250 saves a static image of the dynamic elements at the same time as the acquired image is recorded rather than determining the state of the dynamic image retrospectively.

The method 250 then proceeds to block 262 where the dynamic elements are subtracted from the acquired image. In one embodiment, the dynamic elements are removed using pixel subtraction. In a pixel subtraction process, the pixel values of the dynamic element are subtracted from the pixel values in the acquired image. Where the dynamic elements include colors, each of the values of the red, blue and green components may be subtracted separately. In an embodiment where a Region of Interest is defined, the subtraction of the dynamic elements may be performed within the Region of Interest, or within the Region of Interest and an area adjacent the Region of Interest.

In an embodiment, image compensation or re-calibration techniques may also be applied to the image. In one embodiment, brightness and color distortion are compensation is applied, and a blur filter used. Brightness/color compensation provide adjustments when the image is viewed from the camera is different in its brightness and color from the original image being subtracted. The blur filter is used to compensate for when the image viewed from the camera is out of focus. In an embodiment, the parameters for brightness/color compensation and blur filter may be determined by using previous image frames for reference. For example, by comparing the actually viewed image and the original source image, and iteratively finding the compensation and filter parameters so that the compensated version from the original image becomes substantially the same as the viewed image.

After the dynamic elements are subtracted, or when the query block 258 returns a negative, the method 250 proceeds to block 264 where the reflection of the object is identified in the acquired image. The method 250 then proceeds to block 266 where the location of the object relative to the camera is determined. In block 268 an optional step of object location is transformed into a local frame of reference. The method 250 may then proceed to perform a predetermined action in block 270 as discussed herein.

It should be appreciated that the method 250 of removing dynamic elements from the acquired image may be used in any of the embodiments described herein, such as with method 200 and method 220 for example.

Some embodiments described herein, such as those that include the cellular phone device for example, describe the determination of the location of the object or user's finger as being performed on the computing device. However, in other embodiments, the determination of the location of the object may be performed by the integrated circuit of the camera that acquires the image for example. The camera then outputs the coordinates to other devices. In still another embodiment, the acquired images are transmitted to one or more distal or remote computing devices that perform image analysis and determine the object location. In an embodiment, the remote computing devices may be in a distributed network or a cloud computing environment. In some embodiments this may provide advantages in improving the speed of processing of higher resolution images to improve accuracy for example.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:
On-demand self-service: a cloud consumer can unilaterally provision computing capabilities, such as server time and network storage, as needed automatically without requiring human interaction with the service's provider.
Broad network access: capabilities are available over a network and accessed through standard mechanisms that promote use by heterogeneous thin or thick client platforms (e.g., mobile phones, laptops, and PDAs).
Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).
Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.
Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:
Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.
Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.
Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:
Private cloud: the cloud infrastructure is operated solely for an organization. It may be managed by the organization or a third party and may exist on-premises or off-premises.
Community cloud: the cloud infrastructure is shared by several organizations and supports a specific community that has shared concerns (e.g., mission, security requirements, policy, and compliance considerations). It may be managed by the organizations or a third party and may exist on-premises or off-premises.
Public cloud: the cloud infrastructure is made available to the general public or a large industry group and is owned by an organization selling cloud services.
Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 12:
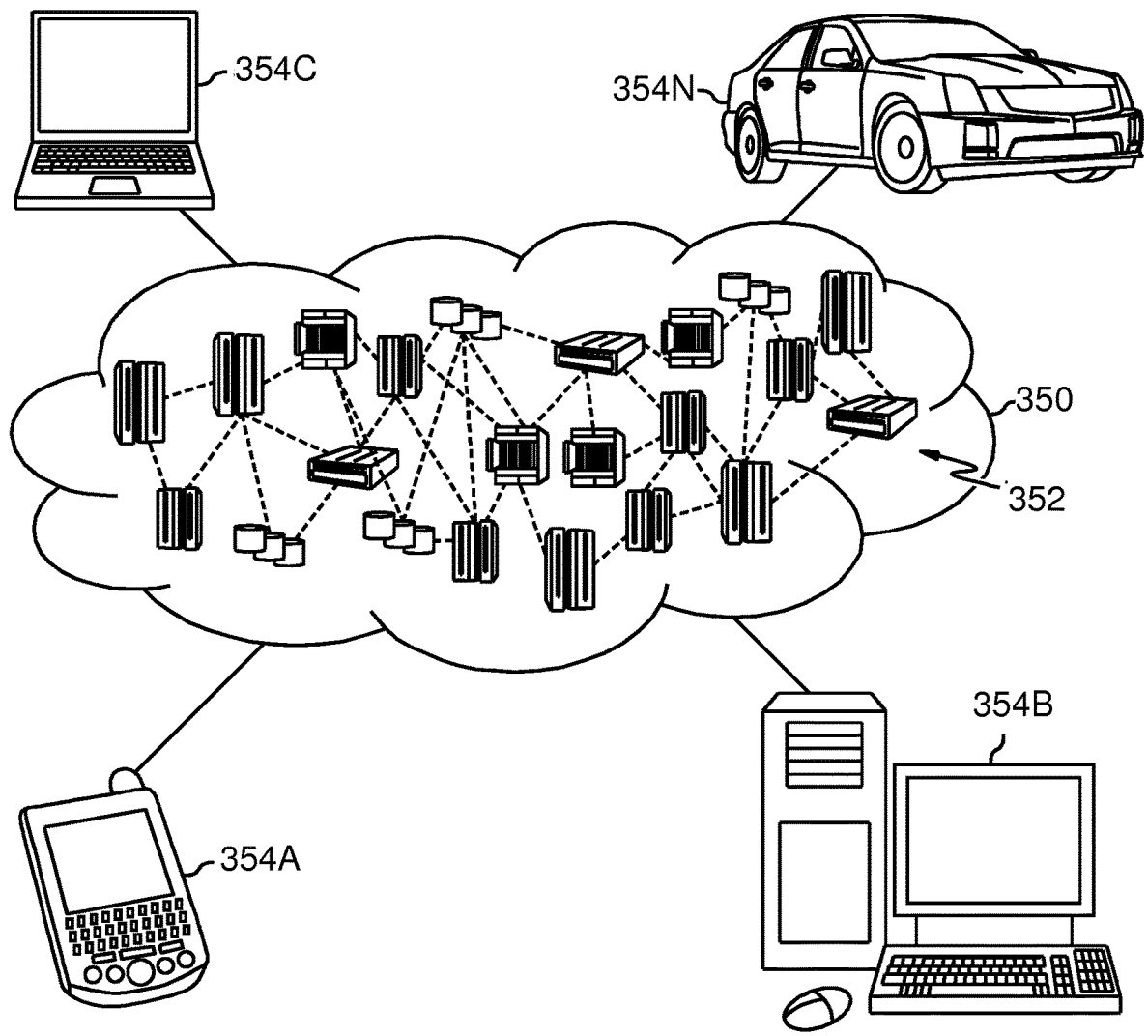
FIG. 12 depicts a cloud computing environment according to an embodiment of the present invention.

Referring now to FIG. 12, illustrative cloud computing environment 350 is depicted. As shown, cloud computing environment 350 comprises one or more cloud computing nodes 352 with which local computing devices used by cloud consumers, such as, for example, personal digital assistant (PDA) or cellular telephone 354A, desktop computer 354B, laptop computer 354C, and/or automobile computer system 354N may communicate. Nodes 352 may communicate with one another. They may be grouped (not shown) physically or virtually, in one or more networks, such as Private, Community, Public, or Hybrid clouds as described hereinabove, or a combination thereof. This allows cloud computing environment 350 to offer infrastructure, platforms and/or software as services for which a cloud consumer does not need to maintain resources on a local computing device. It is understood that the types of computing devices 354A-N shown in FIG. 12 are intended to be illustrative only and that computing nodes 352 and cloud computing environment 350 can communicate with any type of computerized device over any type of network and/or network addressable connection (e.g., using a web browser).

Figure 13:
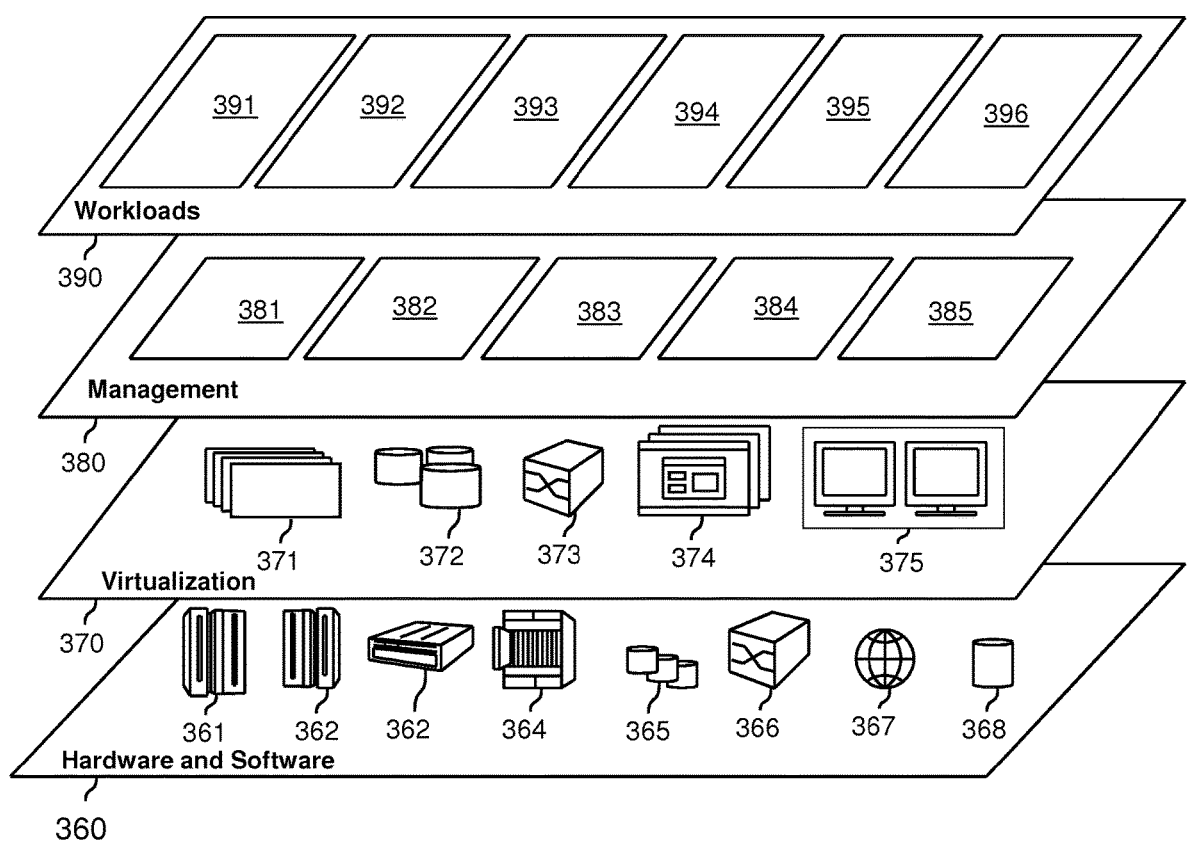
FIG. 13 depicts abstraction model layers according to an embodiment of the present invention.

Referring now to FIG. 13, a set of functional abstraction layers provided by cloud computing environment 350 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 360 includes hardware and software components. Examples of hardware components include: mainframes 361; RISC (Reduced Instruction Set Computer) architecture based servers 362; servers 363; blade servers 364; storage devices 365; and networks and networking components 366. In some embodiments, software components include network application server software 367 and database software 368.

Virtualization layer 370 provides an abstraction layer from which the following examples of virtual entities may be provided: virtual servers 371; virtual storage 372; virtual networks 373, including virtual private networks; virtual applications and operating systems 374; and virtual clients 375.

In one example, management layer 380 may provide the functions described below. Resource provisioning 381 provides dynamic procurement of computing resources and other resources that are utilized to perform tasks within the cloud computing environment. Metering and Pricing 382 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 383 provides access to the cloud computing environment for consumers and system administrators. Service level management 384 provides cloud computing resource allocation and management such that required service levels are met. Service Level Agreement (SLA) planning and fulfillment 385 provides pre-arrangement for, and procurement of, cloud computing resources for which a future requirement is anticipated in accordance with an SLA.

Workloads layer 390 provides examples of functionality for which the cloud computing environment may be utilized. Examples of workloads and functions which may be provided from this layer include: mapping and navigation 391; software development and lifecycle management 392; virtual classroom education delivery 393; data analytics processing 394; transaction processing 395; and an image processing and object location processing 396. The image processing and object location processing 396 may perform one or more methods that allow the pre-touch interface system to operate, such as but not limited to the methods described in reference to FIGS. 9-11 for example.

Technical effects and benefits of some embodiments include providing a system interface that includes pre-touch localization or non-contact of an object relative to a reflective surface. Further technical effects and benefits is to allow a pre-touch interface that allows a user to interact with, control and input data into a computing device without touching the device and facilitates prevention of contamination between the user and the reflective surface.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   acquiring a first image of an object and a reflective surface with a camera, the camera positioned on a front face of a housing adjacent the reflective surface and a mirror, the mirror in a second housing, the second housing positioned offset from the front face and oriented to receive light reflected off of the reflective surface, wherein the second housing comprises two side walls configured to limit a field of view of the camera to a portion of the reflective surface, and wherein acquiring the first image includes collecting a first meta-data for the first image;

determining a dynamic element is displayed on the reflective surface, wherein the determining the dynamic element includes collecting a second meta-data for the dynamic element;
defining a region of interest comprising an area extending from the object to the reflective surface, wherein the region of interest comprises a region that is twenty five percent of an area of the first image;
determining that the dynamic element is within the region of interest;
generating a second image by subtracting a portion of the dynamic element that is within the region of interest from the first image, wherein the subtracting the dynamic element from the first image includes comparing the first meta-data and the second meta-data to identify the dynamic element at a time the first image was acquired;
identifying the object in one of the first image and second image, wherein the identifying the object in the first image comprises:
   determining a convex hull enclosing a contour of the object in the first image, wherein the convex hull is a polygon representing a shape; and
   comparing the convex hull to a predetermined threshold to determine an object type of the object in the first image;
identifying in the second image a reflection of the object on the reflective surface, wherein the identifying the reflection of the object on the reflective surface comprises:
   analyzing a shape within the region of interest; and
   determining the shape to have a shape similar to the object in the first image;
determining three-dimensional coordinates of at least a portion of the object based at least in part on the identifying of the object and the identifying of the reflection of the object;
applying a brightness and color distortion compensation to the first image; and
applying a blur filter to the first image.

2. The method of claim 1 wherein the determining the dynamic element is displayed includes determining a time when the first image was acquired and determining a third image of the dynamic element displayed on the reflective surface at the time; and further comprising generating a third image of the dynamic element at the same time the first image is acquired.

3. The method of claim 1 wherein the subtracting the dynamic element from the first image includes subtracting a first plurality of pixel values of the dynamic element from a second plurality of pixel values of the first image.

4. The method of claim 1 further comprising defining a region in the first image based at least in part on a position of the object in the first image, the region being a portion of the first image.

5. The method of claim 4 wherein the subtracting the dynamic element from the first image is performed in the region.

6. The method of claim 1, wherein the reflective surface comprises a countertop.

7. The method of claim 1, wherein identifying the object in one of the first image further comprises:
   comparing a color of the object to a color range of human skin to determine that the object comprises a fingertip.

8. The method of claim 1, wherein the mirror is removably coupled to the housing.

9. The method of claim 1, wherein determining three-dimensional coordinates of at least a portion of the object based at least in part on the identifying of the object and the identifying of the reflection of the object comprises:
   determining a location of the object, the location comprising two orthogonal coordinates of a point on the reflective surface that is closest to an end of the object, and wherein determining the location of the object comprises a height coordinate representing a distance from the reflective surface to the end of the object.

10. A system comprising:
a housing;
a reflective surface on a front face of the housing;
a camera positioned on the front face adjacent the reflective surface;
a mirror in a second housing, the second housing positioned offset from the front face and adjacent the reflective surface and the camera, the mirror oriented to receive light reflected off of the reflective surface, the second housing being removably coupled to the housing, and wherein the second housing comprises two side walls configured to limit a field of view of the camera to a portion of the reflective surface;
a memory having computer readable instructions; and
one or more processors for executing the computer readable instructions, the one or more processors being coupled for communication to the camera, the computer readable instructions comprising:
acquiring a first image of an object and the reflective surface with the camera, wherein acquiring the first image includes collecting a first meta-data for the first image;
determining a dynamic element is displayed on the reflective surface, wherein the determining the dynamic element includes collecting a second meta-data for the dynamic element;
defining a region of interest comprising an area extending from the object to the reflective surface, wherein the region of interest comprises a region that is twenty five percent of an area of the first image;
determining that the dynamic element is within the region of interest;
generating a second image by subtracting a portion of the dynamic element that is within the region of interest from the first image, wherein the subtracting the dynamic element from the first image includes comparing the first meta-data and the second meta-data to identify the dynamic element at a time the first image was acquired;
identifying the object in one of the first image and second image, wherein the identifying the object in the first image comprises:
   determining a convex hull enclosing a contour of the object in the first image, wherein the convex hull is a polygon representing a shape; and
   comparing the convex hull to a predetermined threshold to determine an object type of the object in the first image;
identifying in the second image a reflection of the object on the reflective surface, wherein the identifying the reflection of the object on the reflective surface comprises:
   analyzing a shape within the region of interest; and
   determining the shape to have a shape similar to the object in the first image;

determining three-dimensional coordinates of at least a portion of the object based at least in part on the identifying of the object and the identifying of the reflection of the object;

applying a brightness and color distortion compensation to the first image; and applying a blur filter to the first image.

11. The system of claim 10 wherein the determining the dynamic element is displayed includes determining a time when the first image was acquired and determining a third image of the dynamic element displayed on the reflective surface at the time.

12. The system of claim 11 wherein the computer readable instructions further comprise generating a third image of the dynamic element at the same time the first image is acquired.

13. The system of claim 10 wherein the subtracting the dynamic element from the first image includes subtracting a first plurality of pixel values of the dynamic element from a second plurality of pixel values of the first image.

14. The system of claim 10 wherein the computer readable instructions further comprise defining a region in the first image based at least in part on a position of the object in the first image, the region being a portion of the first image.

15. The system of claim 14 wherein the subtracting the dynamic element from the first image is performed in the region.

16. A computer program product for determining a location of an object relative to a reflective surface, the computer program product comprising a non-transitory computer readable storage medium having program instructions embodied therewith, the program instructions executable by a processor to cause the processor to perform:

acquiring a first image of an object and a reflective surface with a camera, the camera positioned on a front face of a housing adjacent the reflective surface and a mirror, the mirror in a second housing, the second housing positioned offset from the front face and oriented to receive light reflected off the reflective surface, wherein the second housing comprises two side walls configured to limit a field of view of the camera to a portion of the reflective surface, and wherein acquiring the first image includes collecting a first meta-data for the first image;

determining a dynamic element is displayed on the reflective surface, wherein the determining the dynamic element includes collecting a second meta-data for the dynamic element;

defining a region of interest comprising an area extending from the object to the reflective surface, wherein the region of interest comprises a region that is twenty five percent of an area of the first image;

determining that the dynamic element is within the region of interest;

generating a second image by subtracting a portion of the dynamic element that is within the region of interest from the first image, wherein the subtracting the dynamic element from the first image includes comparing the first meta-data and the second meta-data to identify the dynamic element at a time the first image was acquired;

identifying the object in one of the first image and second image, wherein the identifying the object in the first image comprises:

determining a convex hull enclosing a contour of the object in the first image, wherein the convex hull is a polygon representing a shape; and comparing the convex hull to a predetermined threshold to determine an object type of the object in the first image;

identifying in the second image a reflection of the object on the reflective surface, wherein the identifying the reflection of the object on the reflective surface comprises:

analyzing a shape within the region of interest; and determining the shape to have a shape similar to the object in the first image;

determining three-dimensional coordinates of at least a portion of the object based at least in part on the identifying of the object and the identifying of the reflection of the object;

applying a brightness and color distortion compensation to the first image; and applying a blur filter to the first image.

17. The computer program product of claim 16 wherein the determining the dynamic element is displayed includes determining a time when the first image was acquired and determining a third image of the dynamic element displayed on the reflective surface at the time.

18. The computer program product of claim 17 further comprising generating a third image of the dynamic element at the same time the first image is acquired.

19. The computer program product of claim 16 wherein the subtracting the dynamic element from the first image includes subtracting a first plurality of pixel values of the dynamic element from a second plurality of pixel values of the first image.

20. The computer program product of claim 16 further comprising defining a region in the first image based at least in part on a position of the object in the first image, the region being a portion of the first image, and wherein the subtracting of the dynamic element from the first image is performed in the region.

* * * * *